July 19, 1949.  J. L. CORCORAN ET AL  2,476,285
SAFETY VALVE
Filed June 20, 1944  2 Sheets-Sheet 1
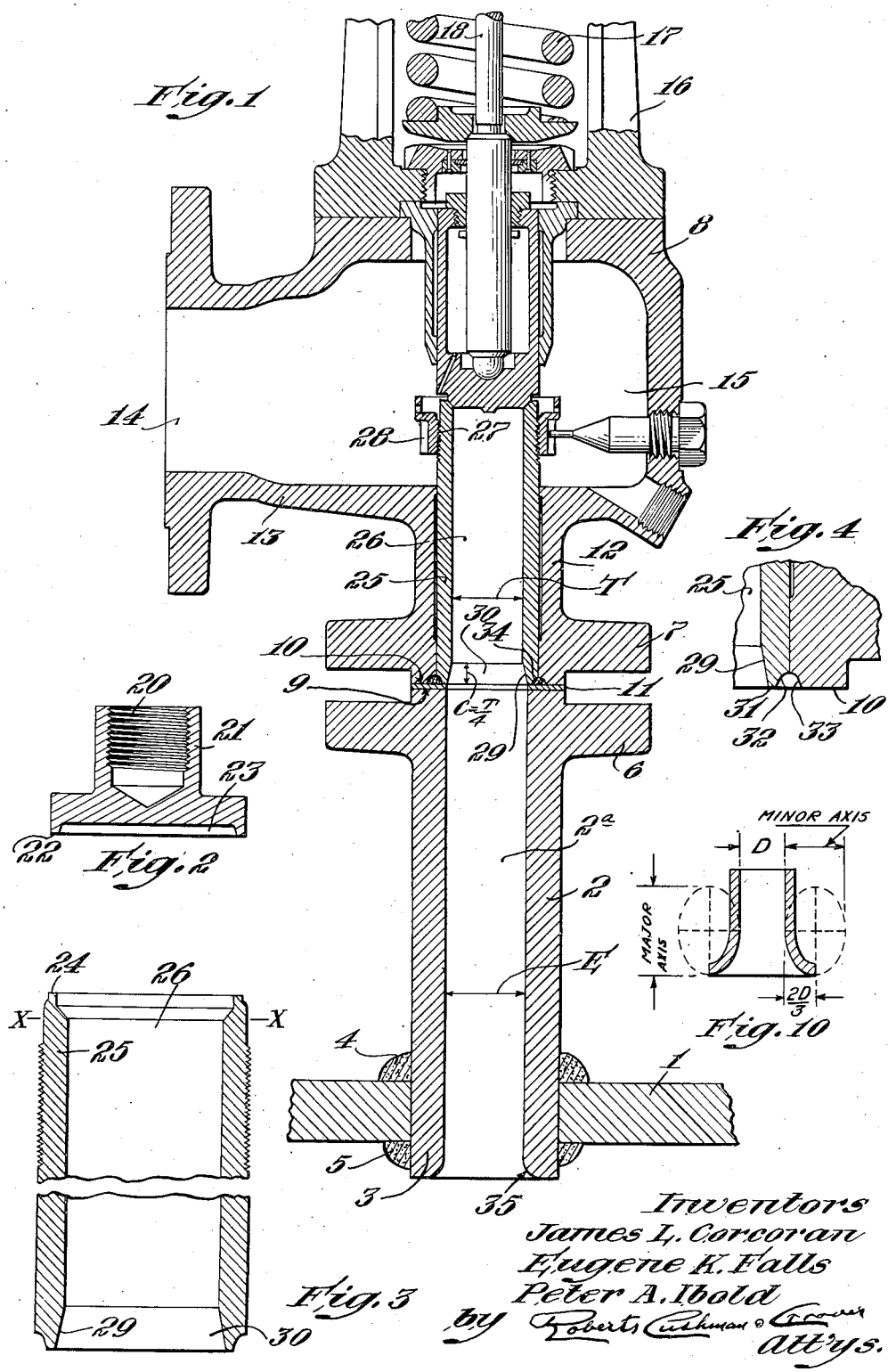
Inventors
James L. Corcoran
Eugene K. Falls
Peter A. Ibold
by Roberts Cushman & Grover
att'ys.

Inventors
James L. Corcoran
Eugene K. Falls
Peter A. Ibold
by Roberts Cushman & Grover
Att'ys.

Patented July 19, 1949

2,476,285

UNITED STATES PATENT OFFICE 2,476,285

SAFETY VALVE

James L. Corcoran, Bridgeport, Conn., and Eugene K. Falls, Potsdam, N. Y., and Peter A. Ibold, Bridgeport, Conn., assignors to Manning, Maxwell & Moore, Incorporated, New York, N. Y., a corporation of New Jersey Application June 20, 1944, Serial No. 541,156

3 Claims. (Cl. 137—53)

This invention pertains to safety valves for steam boilers or other containers for pressure fluid, and more especially to a valve designed to provide maximum capacity of discharge.

The basic problem of the designer of a high capacity safety valve is to provide a means whereby a maximum quantity of fluid may be discharged from the pressure container through an aperture of a given size in the container shell. Any opening in the shell of the container weakens the latter, and thus the permissive size of any given opening is strictly limited so that the safety valve designer is definitely restricted as to the size of aperture which may be used. On the other hand, under present engineering conditions, it is requisite to be able to discharge very large quantities of pressure fluid through the aperture which is thus permitted.

A modern safety valve is an automatic apparatus opening and closing in response to changes of fluid pressure, and it is not at all a simple matter to design such a valve so that it will open and close properly and without excessive blow-down, without substantial sacrifice of capacity. Much experiment has heretofore been carried out with the particular purpose of improving the delivery of pressure fluid after it leaves the valve seat orifice. This problem has heretofore been quite satisfactorily solved so that it is now possible to produce valves of such construction that when the valve head lifts from the seat, it will rise sufficiently to insure free escape of the pressure fluid, but will return to its seat within a blow-down range of 4% or less. Although the pressure fluid is thus free to escape after passing the valve seat orifice, this does not necessarily insure the maximum discharge unless the pressure fluid approach the valve seat orifice at approximately the theoretical maximum rate. While there have been prior attempts to improve this rate of approach, the results have not been wholly satisfactory, and commercial safety valves as heretofore constructed still fall short of maximum efficiency.

The principal object of the present invention is to provide a safety valve of high discharge efficiency, and in particular to provide a valve having the approach passages leading to the valve orifice of such a novel and improved shape that the quantity of pressure fluid discharged through the valve, when open, will approach the theoretical maximum quantity which should pass through the entrance tube in the boiler shell on which the valve is mounted.

From the practical standpoint, it is necessary in many types of installation that the safety valve structure, at least that portion thereof in which the valve head and associated parts are arranged, shall be readily removable from the boiler shell. A customary arrangement provides a tube of some length welded to the boiler shell (in axial alignment with an aperture in the latter), and having a flange at its outer end to which the base flange of the safety valve casing may be bolted.

A further object of the present invention is to provide a safety valve construction of the type just referred to wherein the safety valve, per se, is spaced from the boiler shell and detachably secured to a supporting tube fixed to the shell and at the same time to insure a high capacity.

A further object is to provide an improved valve head such as to avoid interference with the free flow of approach of fluid to the valve orifice when the valve is unseated.

Other and further objects and advantages of the invention will be pointed out hereafter in the following more detailed description and by reference to the annexed drawings, wherein Fig. 1 is a fragmentary vertical section, in the plane of the axis of the delivery passage of the valve, illustrating one desirable embodiment of the present invention;

Fig. 2 is a diametrical vertical section, to somewhat larger scale, through the valve head, illustrating a preferred construction;

Fig. 3 is a fragmentary longitudinal section, to somewhat larger scale than Fig. 1, showing the throat bushing removed from the valve casing;

Fig. 4 is a fragmentary radial section through the lower part of the throat bushing and the lower part of the valve casing showing the parts assembled in readiness for welding;

Fig. 10 is a diagrammatic section illustrative of the characteristics of a standard orifice or flow nozzle.

Figure 5:
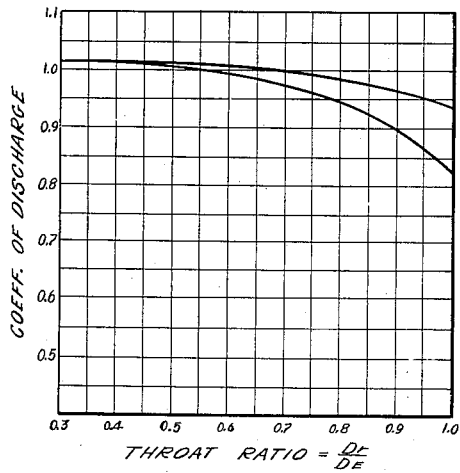
Fig. 5 is a diagram illustrating in general the effects upon flow capacity of a sharp-edge entrance passage as compared with a rounded edge entrance passage.

The theoretical contour of a short delivery passage leading from a pressure container, such as to insure maximum discharge for a given diameter of passage, has long been known. Such a short passage is commonly termed a "flow nozzle" or is sometimes referred to as a "standard orifice." A flow nozzle of this type has a rounded (toric) converging entrance section, a short straight passage (ideally of about one diameter in length) termed the "throat" where the diameter of the fluid passage is at a minimum, and a diverging section beyond the throat which is of increasing diameter or cross-sectional area.

A flow nozzle is defined in the A. S. M. E. Power Test Code publication "Flow Measurement, 1940," article 89, as being of a shape such that the flow shall be as nearly as possible the theoretical flow corresponding to the pressures so that the discharge coefficient is as near unity as possible. The shape of flow passage (Fig. 10), as indicated in the publication, calls for an entrance which is of elliptical radial section with the minor semi-axis of the ellipse equal to two-thirds of the throat diameter, i. e., the distance radially outward from the straight throat.

The characteristics of a flow nozzle or standard orifice have otherwise been defined as follows:

"A standard orifice is one in which elastic fluid escapes under pressure at maximum delivery for the minimum cross section of the orifice, entirely fills all parts of the orifice, and exerts maximum aggregate pressure on the side of the orifice throughout its length."

In order to produce safety valve capacities which are large, relative to the "inlet" diameter, that is to say, the diameter of the opening in the boiler shell, the valve structure should have a flow passage approximating in contour that of the theoretical flow nozzle, that is to say, it should have a rounded converging entrance, second, a short cylindrical throat passage, and, third, a diverging section beyond the throat. In a usual commercial safety valve of the nozzle type, the passage which begins at the upper end of the converging section and terminates at or below the valve seat orifice (the plane of the valve seat) corresponds to the "throat" of the theoretical flow nozzle, while the annular space between the lifted valve head and the seat, and whose outlet is defined in part by the blow-down ring and adjacent elements, constitutes the diverging section of the nozzle.

For unimpeded flow, the surfaces of the passage and especially the throat must be as smooth as possible. Under ideal conditions, the rounded entrance would merge directly with the throat. However, as above noted, commercial installations require an "entrance tube" welded to the boiler, and the provision of means for removably attaching the valve proper to the entrance tube. The entrance tube is usually a piece of commercial tubing, and its inner surface is usually relatively rough as compared with the wall of the throat passage in the valve proper. There must needs be a joint somewhere between the boiler and the valve body, and the valve body must be spaced from the boiler shell. To meet all the requirements and at the same time to approximate theoretical nozzle flow, the present invention divides the converging section of the flow nozzle into two parts, first, a rounded portion at that end of the entrance tube which is welded to the boiler shell, and, second, a conical section at the entrance to the throat proper and which provides but a slight reduction in diameter, the larger end of the conical section being substantially in the plane of the joint between the entrance tube and valve body. The throat proper may thus be wholly within the valve casing and may thus be smoothly continuous and without break or change in diameter, and may be formed in a single unitary piece of material, preferably of non-corrosive type, while the joint is located at the delivery end of the entrance tube where the entrance passage is of full diameter.

While in the ideal nozzle the throat is only about one diameter long, it is necessary for practical considerations that the throat passage of a commercial valve as herein disclosed be somewhat longer, for instance approximately four diameters, since the flow passage must extend through the thickness of the valve inlet flange and up to about the center line of the outlet connection of the valve. While the extended throat tends to increase the friction and thus to some extent reduce flow, this loss is not appreciable if the walls of the passages are made and kept smooth.

In discussing valves of this type, reference is frequently made to the "throat ratio." In the following discussion, this term means the ratio of the throat diameter to the internal diameter of the cylindrical portion of the entrance tube. This throat ratio is usually considerably less than unity, the maximum throat ratio which has heretofore been used commercially being approximately 0.75. Obviously an increase in the throat diameter, that is to say an increase in throat ratio, tends to increase capacity even though the rate of flow per unit of throat cross-sectional area is not thereby increased. Thus, in designing a valve, if a large throat ratio can be employed and at the same time provision made for maximum discharge over the valve seat, the greatest possible capacity is thereby at least approached. As above noted, constructions insuring high efficiency of discharge over the valve seat have already been made available. In accordance with the present invention, it is possible, as a practical matter, to increase the throat ratio beyond that commonly employed, with the result that a higher capacity for a given opening in the boiler shell is attainable than has heretofore been thought possible.

In accordance with the present invention, the entrance tube is caused to project into the boiler and is welded both to the inside and outside of the latter, thus providing a much stronger joint than though the tube were merely butted against the shell, although the mouth of the fluid flow passage remains of the same diameter as the opening in the boiler shell, and the large reduction in diameter is made to occur at the rounded entrance to this entrance tube which is entirely within the boiler shell. Although the thickness of the tube wall is thus reduced substantially in making the rounded entrance, this portion of the tube is within the boiler and supported by the boiler shell, so that no harm results from this rounding of the entrance to the entrance tube. This rounded entrance is preferably obtained by turning a radius at the inside of the tube, and as a result of this construction, it is possible to provide a throat ratio as high as 0.90 which, for a given valve construction, indicates a substantial increase in capacity as compared with prior practice.

Referring to the drawings, the numeral 1 designates a portion of the shell of a pressure fluid container, for example, the shell of a steam boiler, the shell having an aperture which receives the lower end of the entrance tube 2. This tube is preferably so arranged that its lower end portion 3 projects into the interior of the boiler an appreciable distance, the tube being welded to the boiler shell exteriorally as indicated at 4, and preferably also at the interior of the shell as indicated at 5, thus providing an extremely rigid and secure anchorage for the tube. This tube 2 may be a section of standard tubing or it may be a forging or the like, in the latter event having the attaching flange 6 integral with the tube. If the tube 2 be a section of plain, cylindrical tubing, the attaching flange 6 may be welded or otherwise secured to the tube proper. The flange 6 is provided with apertures (not shown) for the reception of bolts which also extend through apertures (not shown) in the base flange 7 of the casing 8 of the valve proper, the bolts being designed removably to secure the valve casing to the entrance tube 2. The entrance tube 2 is of such length for example, as herein shown, (approximately six times its internal diameter E) as to make it readily possible to introduce the attaching bolts, and also to space the valve casing at such a distance from the boiler as to facilitate connection of the discharge pipe to the valve casing. The upper end 9 of the entrance tube 2 is a finished surface designed to register with a finished surface 10 at the lower end of the valve casing, a gasket 11 being usually interposed between the surfaces 9 and 10. As here illustrated, the valve casing comprises the neck portion 12 integral with the flange 7 and integral at its upper part with the body of the casing. The casing also comprises the lateral hollow arm 13 providing the delivery passage 14 leading outwardly from the valve chamber 15. The valve casing may also comprise the bonnet 16 which houses the valve loading spring 17 which reacts at its lower end against a collar carried by the valve stem 18. The lower end of the valve stem, as here illustrated, is seated in a socket 20 (Fig. 2) in the valve head 21. In a preferred construction, according to the present invention, this valve head has an annular downwardly directed flange whose lower edge 22 is finished to constitute a seat-engaging surface, this annular flange defining a shallow recess 23. The surface 22 is designed to cooperate with the seat surface 24 (Fig. 3) at the upper end of the throat bushing 25. This throat bushing may, for example, be in general of the kind disclosed in the patent to Briscoe, No. 2,293,799, dated August 25, 1942, being a cylindrical tube, preferably of corrosion- and wear-resistant material, for instance stainless steel, and providing the throat passage 26 which is accurately cylindrical and has a smoothly finished wall. This cylindrical passage 26 terminates at its upper end at the plane X—X (Fig. 3), the upper end of the bushing preferably being beveled to provide a section of slightly larger diameter from this plane X—X to the plane of the seat surface 24. At its lower end the throat bushing 25 is furnished with a downwardly divergent conical inner surface 29, thus providing an upwardly converging entrance or mouth 30 for the throat passage. The taper of the surface 29 is relatively slight, for example 10°, the axial length of the tapered portion of the tube being, for example, of the order of one-fourth the diameter T of the throat passage, while the maximum diameter of this entrance 30 is equal to the diameter E of the entrance passage 2ª in the tube 2. The parts are so constructed and arranged that when the valve casing is mounted on the entrance tube 2, the entrance passage 2ª in the entrance tube 2 is accurately aligned with the throat passage 26. While the throat bushing 25 is here shown as bearing externally against the wall of the casing 8 at points near the floor of the valve chamber 15, and also at the extreme lower part of the casing, it may be preferred to arrange the parts so that the bushing will be free from contact with the valve casing except at points in the plane of or below the flange 7. On the other hand, the throat bushing, or its equivalent, may be integral with the casing body. Preferably the lower surfaces of the bushing 25 and of the casing are provided with recesses 32 and 33, respectively (Fig. 4), and after assembling the bushing and casing, welding metal 34 is introduced into these recesses, thereby permanently uniting the bushing and casing, the welding metal being finished off flush with the lower surfaces 31 and 10 of the parts 25 and 7.

Figure 6:
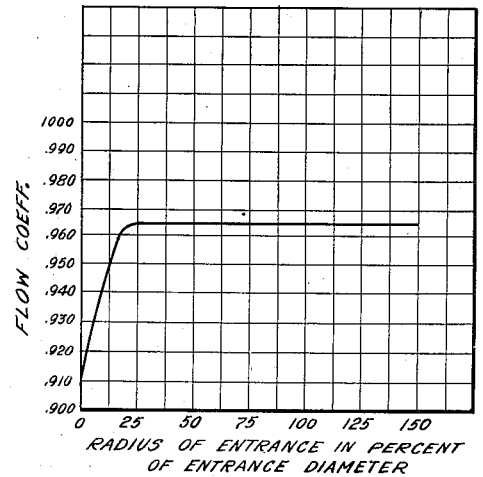
Fig. 6 is a graphic diagram illustrating the effect of varying the radius of curvature of the curved entrance to the inlet passage of the valve.

In accordance with the present invention, the lower end of the entrance tube 2 is so shaped as to have the curved or toric inner surface 35. This curved surface extends from the cylindrical wall of the passage 2ª to the outer diameter of the tube 2. Thus, the maximum diameter of the entrance to the passage through which fluid escapes from the boiler is identical with the diameter of the opening made in the boiler shell. As indicated in Fig. 5, the shape of the entrance mouth to the flow nozzle is of great importance; thus, as shown in this figure, the upper line indicates the coefficient of discharge when using a rounded entrance, satisfying the minimum requirement of 22.2% hereafter referred to, while the lower line shows comparatively the effect of using a sharp edged entrance. Even when a curved entrance is employed, experiment has shown that it is necessary to employ an entrance having the proper radius of curvature. As illustrated in Fig. 6, the flow coefficient, as experimentally determined, increased with increase in the radius of curvature until the radius of curvature of the entrance mouth was 22.2% of the diameter of the entrance tube proper, thereafter further increase in radius did not substantially vary the flow coefficient. There is thus a definite lower limit of useful radius of curvature, 22.2% being the minimum curvature for optimum results. Although apparently there is no theoretical upper limit to the radius of curvature, practical considerations, for example difficulty in machining a large radius internally of a relatively small tube, the progressively increasing sharpness of the edge of the tube resultant from increasing radius of curvature, etc., have led to the conclusion that an upper limit of approximately 44.4% radius of curvature should not be exceeded.

The radius of curvature of this curved or toric entrance surface 35 should thus have a minimum value of 0.222E and should not exceed approximately 0.444E.

With the understanding that the valve proper, including the valve head 21, its seat surface, the adjustable blow-down ring 28, and the adjacent parts designed to control flow of the fluid after leaving the seat orifice are of the appropriate type to insure maximum discharge of the fluid after it leaves the seat orifice, for example, if it be assumed that the valve construction is of the general type disclosed in the patents to Hopkins, No. 1,925,323, September 5, 1933, or No. 2,035,129, dated March 24, 1936, then with the improved formation of the flow nozzle leading from the boiled to the seat orifice as herein disclosed, a discharge capacity exceeding that of any previously known pop-type valve is assured, the throat ratio approximating 0.9 as compared with usual commercial throat ratios of from 0.65 to 0.75. These improved results are believed to be due to the division of the converging section of the flow nozzle, since, as hereinafter pointed out with reference to Fig. 9, the capacity of the valve is substantially greater when employing this divided converging section than when the converging section is all confined to one part of the flow passage.

"Lift ratio" is a term employed in the safety valve art to denote the ratio of the lift of the valve head from its seat to the throat diameter, that is to say, $$\frac{\text{lift of head 21}}{T}$$

It has heretofore been suggested that by designing the valve to have a lift ratio of 0.25, maximum discharge could be obtained, but careful experiment shows that with the usual form of inlet throat and valve head the lift ratio must approximate 0.40 in order that the delivery may approximate the theoretical delivery through the unobstructed throat. However, such a high lift involves so many complications in structure and function that it is not commonly employed. It has been quite customary in prior valve devices to provide the valve head with a downwardly projecting, more or less conical boss which, when the valve is closed, is located within the seat orifice. Experiment seems to indicate that the presence of this boss increases the required lift ratio and is in part at least responsible for the fact that maximum discharge is not ordinarily obtained at a lift ratio of 0.25. In accordance with the present invention, as above described, this boss is omitted and the under surface of the valve head is recessed. This construction appears to contribute to the improved results obtained by the use of the novel flow passage herein described, so as to provide maximum capacity at a lift ratio not exceeding 0.25.

According to the above definition of a flow-nozzle or standard orifice, the "throat" of the valve structure of the present invention is that part of the flow passage within the bushing 25 which extends from the smallest diameter of the converging entrance 30 to the plane X—X just below the valve seat 24, this portion of the passage being that which is of the least diameter.

Figures 7, 8:
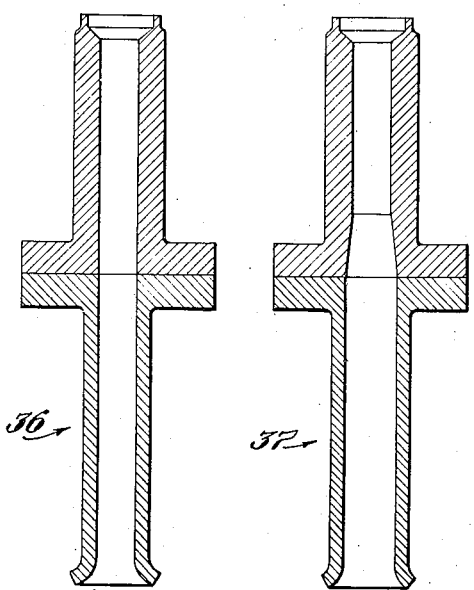
Fig. 7 is a more or less diagrammatic axial section through a flow nozzle having a throat ratio of unity.
Fig. 8 is a similar diagrammatic section of a flow nozzle having its converging section divided in accordance with the present invention, and having a throat ratio of approximately 0.90.
Figure 9:
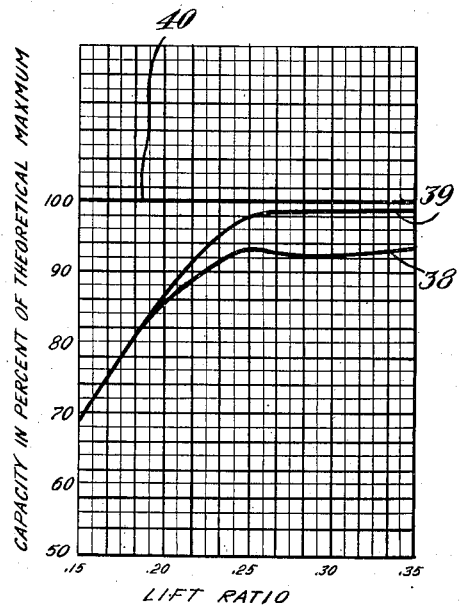
Fig. 9 is a graphic diagram showing comparatively the effects on capacity of the arrangements of Figs. 7 and 8.

While a throat ratio of unity may be attained by locating the entire converging section of the flow passage at a single point, for example by making the entire reduction in area at the mouth of the entrance tube and maintaining the diameter of the passage constant from the point of smallest diameter of this entrance mouth to the valve seat, it is difficult with such an arrangement to attain the required lift ratio for full flow, and, moreover, such an arrangement has been found experimentally to result in excessive friction with consequent reduction in flow. Actual tests made by the use of a test boiler having a capacity of 25,000 pounds per hour at 600 p. s. i. pressure conclusively demonstrating that the division of the converging section into two parts, in accordance with the present invention, results in a greater flow efficiency, at a throat ratio of approximately 0.90, than is obtained by any arrangement having the converging section all located at one point and with the parts designed to produce a throat ratio of approximately unity. Test flow-nozzles, such as were employed for these experiments, are illustrated by way of example at 36 and 37, in Figs. 7 and 8, respectively. In Fig. 9, curves 38 and 39 illustrate the flow efficiency of these respective types of nozzle under test conditions, the line 40 representing the optimum theoretical condition. It is readily observable, by comparison of curves 38 and 39, that the employment of the arrangement of Fig. 7, having a throat ratio of unity, does not result in a flow efficiency as high as that resulting from the use of a nozzle such as shown in Fig. 8 in which the converging section is divided in accordance with the present invention.

While the arrangement herein specifically illustrated and described constitutes one desirable embodiment of the invention, it is to be understood that the invention is to be regarded as broadly inclusive of any and all equivalent arrangements which fall within the scope of the appended claims.

We claim:

1. A steam safety valve assembly for use on a pressure fluid container, said assembly including a valve casing which houses seat-supporting means, an annular valve seat, a movable valve head cooperative therewith, and spring means urging the valve head toward the seat, said assembly also including an entrance tube, of a length several times its internal diameter, to one end of which the valve casing is removably secured, characterized in that the tube and seat-supporting means are shaped to provide a fluid passage leading to the valve seat, said fluid passage having a smoothly rounded entrance of a maximum diameter substantially equaling the outside diameter of the entrance tube, the fluid passage comprising aligned cylindrical portions of successively smaller diameters, with a conically converging portion interposed between said cylindrical portions, the axial length of said converging portions being of the order of one-fourth the diameter of the smaller of said cylindrical portions.

2. A steam safety valve assembly for use on a pressure fluid container, said assembly including a valve casing which houses an annular valve seat, a movable valve head cooperable therewith and a throat bushing supporting said seat, resilient means urging the valve head toward the seat, the assembly also including an entrance tube, of a length several times its internal diameter, to one end of which the valve casing is removably secured, characterized in that the tube and throat bushing are shaped, respectively, to form an entrance passage of substantially uniform diameter and the throat portion of a flow nozzle, said throat portion being of substantially uniform but smaller diameter than the entrance passage, the entrance tube being shaped to provide a toric entrance to the entrance passage, and the throat portion having a conic entrance, the ratio of the diameter of the throat portion to the diameter of the entrance passage being approximately 0.90.

3. A safety valve assembly for use on a pressure fluid container having an aperture in its wall, said assembly including an entrance tube, of a length several times its internal diameter, and a valve casing, one end of the tube being designed to be removably secured to the valve casing, the valve casing having within it a tubular element supporting an annular valve seat, a movable valve head cooperable with the seat, and spring means urging the valve head toward the seat, characterized in that the entrance tube and said seat-supporting element are shaped to provide a flow nozzle, the entrance tube having a cylindrical bore of uniform diameter having a toric entrance whose maximum diameter is substantially equal to the outside diameter of the entrance tube, the nozzle including a cylindrical throat portion of smaller diameter than the cylindrical bore of the entrance tube and having a conic entrance, the joint between the casing and entrance tube being substantially in the plane of maximum diameter of the conic entrance, the ratio of the diameter of the throat portion to that of the bore of the entrance tube being of the order of 0.90.

JAMES L. CORCORAN.
EUGENE K. FALLS.
PETER A. IBOLD.

REFERENCES CITED

The following references are of record in the file of this patent:

UNITED STATES PATENTS

| Number | Name | Date |
| --- | --- | --- |
| 1,222,071 | Clark | Apr. 10, 1917 |
| 1,233,752 | Clark | July 17, 1917 |
| 1,572,469 | DeLin | Feb. 9, 1926 |
| 1,672,394 | Sargent | June 5, 1928 |
| 1,696,452 | Raymond | Dec. 25, 1928 |
| 1,949,150 | Eplett | Feb. 27, 1934 |
| 2,047,750 | Smith | July 14, 1936 |
| 2,101,682 | Klafstad | Dec. 7, 1937 |
| 2,219,324 | Lee | Oct. 29, 1940 |
| 2,345,389 | Falls | Mar. 28, 1944 |
| 2,347,676 | Eplett | May 2, 1944 |

FOREIGN PATENTS

| Number | Country | Date |
| --- | --- | --- |
| 5,793 | Great Britain | Mar. 9, 1895 |
| 22,373 | Great Britain | Nov. 22, 1893 |
| 103,383 | Great Britain | Jan. 25, 1917 |
| 351,798 | France | May 15, 1905 |
| 354,786 | Germany | June 15, 1922 |